United States Patent
Chapman et al.

(10) Patent No.: US 7,155,207 B2
(45) Date of Patent: Dec. 26, 2006

(54) SYSTEM AND METHOD OF ANALYZING COMMUNICATIONS BETWEEN A CALLING PARTY AND A CALLED PARTY

(75) Inventors: David Chapman, Herndon, VA (US); Ben Levitan, Raleigh, NC (US)

(73) Assignee: Nextel Communications Inc., Overland Park, KS (US)

(*) Notice: Subject to any disclaimer, the term of this patent is extended or adjusted under 35 U.S.C. 154(b) by 0 days.

(21) Appl. No.: 11/158,391

(22) Filed: Jun. 22, 2005

(65) Prior Publication Data

US 2006/0053010 A1    Mar. 9, 2006

Related U.S. Application Data

(60) Provisional application No. 60/608,111, filed on Sep. 9, 2004.

(51) Int. Cl.
  *H04M 1/68* (2006.01)
  *H04M 3/42* (2006.01)
  *H04M 3/22* (2006.01)
  *H04M 1/00* (2006.01)
  *H04Q 7/22* (2006.01)
  *H04Q 7/20* (2006.01)

(52) U.S. Cl. ............... 455/410; 455/415; 455/417; 455/412.1; 455/445; 455/560; 379/35

(58) Field of Classification Search ........ 455/560–561, 455/410–411, 415–418, 517–521, 550.1, 455/405, 563, 67.11–67.12, 403, 445, 412.1, 455/412.2, 414.1, 414.2, 422.1, 461, 414.4; 379/32.01–32.05, 133–134, 35, 111, 112.1, 379/142.06, 142.07, 202.01, 203.01, 210.03, 379/211.01, 212.01, 213.01, 308, 70, 80, 379/68, 85, 88.19, 88.2, 201.07; 704/233–240, 704/231, 243, 246–248, 251–254
See application file for complete search history.

(56) References Cited

U.S. PATENT DOCUMENTS

| | | | | |
|---|---|---|---|---|
| 5,930,698 | A | * | 7/1999 | Bertacchi .................... 455/405 |
| 6,081,707 | A | * | 6/2000 | Christensen et al. ........ 455/413 |
| 6,229,887 | B1 | | 5/2001 | Albers et al. |
| 6,363,339 | B1 | * | 3/2002 | Rabipour et al. ........... 704/201 |
| 6,470,075 | B1 | * | 10/2002 | Prieur ......................... 379/38 |

(Continued)

OTHER PUBLICATIONS

Jeff Tyson, How Carnivor Worked, http://www.howstuffworks.com/carnivore.htm/printable, pp. 1-5. No Date listed

*Primary Examiner*—Meless Zewdu

(57) ABSTRACT

A system and method of analyzing communications between a calling party and a called party is disclosed. In an embodiment of a method of the present invention, the method includes receiving a communication at a service provider network, recording the communication, analyzing a voice content portion of the recorded communication to determine if the voice content portion contains a keyword stored in a database, and forwarding the recorded communication to a law enforcement agency if the keyword is detected in the voice content portion. In an embodiment of a system of the present invention, the system includes a buffer memory for receiving a recorded communication from a service provider network and a content analysis system coupled to the buffer memory. The content analysis system analyzes a voice content portion of the recorded communication to determine if the voice content portion contains a keyword stored in a database and the system forwards the recorded communication to a law enforcement agency if the keyword is detected in the voice content portion.

25 Claims, 2 Drawing Sheets

U.S. PATENT DOCUMENTS

| | | | |
|---|---|---|---|
| 6,728,345 B1* | 4/2004 | Glowny et al. | 379/88.22 |
| 6,963,739 B1* | 11/2005 | Dorenbosch et al. | 455/406 |
| 2004/0148280 A1* | 7/2004 | Chimura | 707/3 |
| 2004/0218731 A1* | 11/2004 | Karimi-Cherkandi et al. | 379/32.01 |
| 2004/0219911 A1* | 11/2004 | Kouchri et al. | 455/423 |
| 2005/0047571 A1* | 3/2005 | Crandell et al. | 379/201.03 |
| 2005/0125666 A1* | 6/2005 | Lin | 713/170 |
| 2005/0175156 A1* | 8/2005 | Afshar et al. | 379/35 |
| 2005/0250476 A1* | 11/2005 | Worger et al. | 455/412.1 |

* cited by examiner

SYSTEM AND METHOD OF ANALYZING COMMUNICATIONS BETWEEN A CALLING PARTY AND A CALLED PARTY

This application claims the benefit of U.S. Provisional Patent Application Ser. No. 60/608,111, filed Sep. 9, 2004, the disclosure of which is herein expressly incorporated by reference.

FIELD OF THE INVENTION

The present invention relates generally to the field of telecommunications, and in particular, to analyzing communications between a calling party and a called party.

BACKGROUND OF THE INVENTION

The Communications Assistance for Law Enforcement Act of 1994 (CALEA) requires telecommunications network providers to provide means for a law enforcement agency to intercept communications occurring over their network when presented with a valid court order. In complying with this requirement, telecommunications providers duplicate the communications associated with a surveillance target, i.e., the person that is the subject of a wiretap order, and deliver the duplicated communications to the law enforcement agency, e.g., the Federal Bureau of Investigation (FBI). However, there are drawbacks with the process of duplicating communications of a surveillance target and providing all of the communications of a surveillance target to the law enforcement agency.

In the current methodology used, all of the communications of a surveillance target are duplicated by the telecommunications provider and delivered to the law enforcement agency. Thus, even if a particular communication of the surveillance target is not directed to the subject matter of the wiretap order, the communication is still duplicated by the telecommunications provider and delivered to the law enforcement agency. It is then the law enforcement agency's responsibility to initially monitor the communication to determine if the subject matter of the communication is within the limits authorized by the wiretap order. If the subject matter of the communication is within the scope of the order, then the law enforcement agency is authorized to further monitor the communication. If the subject matter is not within the scope of the order, the agency must cease monitoring the communication. This requirement for the law enforcement agency to initially determine whether further monitoring is authorized under the wiretap order is generally referred to as "minimization", as will be further described below.

In a wiretap order issued by a judicial officer, the right to wiretap comes with restrictions. Among these restrictions is a requirement for the law enforcement agency to minimize the amount of "listening" it performs. The order only authorizes monitoring of a communication by the law enforcement agency if the communication is related to the subject of the order, e.g., a particular crime that the target is suspected of committing. Therefore, the law enforcement agency must initially monitor the call to determine if it is directed to the subject matter of the wiretap order. The order may also specify the amount of time in which the law enforcement agency must make their determination as to the relevancy of the communication to the subject of the order. For example, the wiretap order issuing authority may specify a minimization time of 30 seconds. After 30 seconds, if the topic of the call is not related to the subject matter of the wiretap order, the law enforcement agency must stop monitoring the call. It may recommence the process on the next communication in the same manner.

This "minimization" process by the law enforcement agency has several drawbacks. First, minimization is not a verifiable activity. Because it is performed by law enforcement agents by physically listening to the communication as it occurs in near real-time, there is no clear record that the law enforcement agents adhered to the legal requirements for the wiretap. As a result, if the communication is monitored and offered as evidence in a trial, the evidence may be subject to attack by the subject as being obtained illegally. For example, the subject could argue that the agents listened beyond the authorized 30 seconds to determine that the call was directed to the subject matter of the order or argue that the content of the call within the minimization period did not authorize further monitoring.

Another drawback results from the minimization time constraints. The law enforcement agency only has a short period of time to determine if the call can be further monitored. A call that does not discuss the subject matter of the wiretap within the minimization period may eventually discuss this subject matter later in the call. However, because the law enforcement agency must make a further monitoring determination early in the call, this later relevant portion of the call may be lost as potential evidence. Even if law enforcement agents are permitted to again determine if the subject matter of the call is relevant to the order after an initial negative determination is made, the agents are still required to make their determination on discrete later portions of the call that may not be relevant even if other portions of the call may be relevant. In this circumstance, again, the relevant portion of the call may be lost as potential evidence.

Therefore, in a "content-wiretap" authorized under Title III of the Omnibus Crime Control and Safe Streets Act of 1968 (Title III), as discussed above, where the content of conversations can be monitored in near real-time, a law enforcement agency is basically presented with an "all-or-nothing" proposition. In a very short period of time after commencement of a conversation, or during discrete later portions of the conversation, the law enforcement agency must determine whether further monitoring is authorized. If it is, the call may be further monitored. If it isn't, the monitoring must cease, even if other portions of the call relate to the relevant issues. This loss of potential evidence is particularly troublesome where many of the factual situations are not clear cut.

This potential loss of relevant evidence is also a problem in "trap-and-trace" monitoring. The vast majority of wiretap orders, approximating 90 percent, only permit law enforcement to determine the time, place and parties involved in a call. This is known as a "trap-and-trace" warrant. Under this type of warrant, a law enforcement agency isn't permitted to hear the content of the speech. In this circumstance, the content of the communication is lost as potential evidence even if it is later determined that the more difficult to obtain Title III content-wiretap was permissible.

There are also drawbacks with the present method of performing wiretaps in the context of dispatch calls, or "walkie-talkie" calls, such as in Nextel Communication Inc.'s push-to-talk (PTT) technology. In a dispatch call, dispatch sessions are not full-duplex conversations and do not have a circuit dedicated to the call, even if it is a virtual circuit, as do circuit-switched calls. PTT sessions are simplex calls. Therefore, in dispatch calls, it is more difficult to monitor a conversation between two or more individuals because there is no dedicated circuit to monitor for the dispatch session. This same problem exists not only for dispatch calls, but also for any type of call that is not carried over a dedicated circuit or routed through a central switch, such as a call made by a cell phone roamer. In the case of a roamer who is not making calls in his home area when a wiretap order is executed, these calls will bypass interception. Only the calls to the subscriber that are routed to their home system will be capable of being monitored.

Another problem that may be particular to dispatch calls is that because no circuit is established for initiation of the dispatch session, and thus no circuit is torn down to clearly define the end of the session, it is difficult to determine when one particular dispatch session has ended and when another new session has begun. This presents problems for law enforcement agencies with respect to their minimization requirements because it may not be clear for a later dispatch session whether the session is part of an earlier session, and thus possibly not be authorized for further monitoring because of the non-relevancy of the earlier session, or whether it is a new session which can be initially monitored for at least the minimization time period.

Therefore, there is a need for an improved system and method for analyzing communications between a calling party and a called party, which would not only have application to the monitoring of communications by law enforcement agencies but also to other applications as well. With respect to law enforcement agency monitoring, the improved system and method could both protect the privacy of the individual being wiretapped and assure and verify compliance by law enforcement agencies to wiretap order requirements.

SUMMARY OF THE INVENTION

A system and method of analyzing communications between a calling party and a called party is provided. In an embodiment of a method of the present invention, the method includes receiving a communication at a service provider network, recording the communication, analyzing a voice content portion of the recorded communication to determine if the voice content portion contains a keyword stored in a database, and forwarding the recorded communication to a law enforcement agency if the keyword is detected in the voice content portion.

In an embodiment of a system of the present invention, the system includes a buffer memory for receiving a recorded communication from a service provider network and a content analysis system coupled to the buffer memory. The content analysis system analyzes a voice content portion of the recorded communication to determine if the voice content portion contains a keyword stored in a database and the system forwards the recorded communication to a law enforcement agency if the keyword is detected in the voice content portion.

DETAILED DESCRIPTION OF THE EXEMPLARY EMBODIMENTS

Whereas an embodiment of the present invention is disclosed in the context of communications over a push-to-talk system (PTT) or push-to-talk over cellular system (PoC), which are sometimes referred to as "walkie-talkie" communications, and which are hereinafter referred to as dispatch systems and communications, the present invention can be practiced in any type of communications system or application where it is desirable to analyze communications between parties, including dispatch systems, and including those on the market today and the systems proposed for Multimedia wireless systems. As discussed previously, dispatch systems generally provide for half-duplex communications between parties where only one party at a time may speak.

Figure 1:
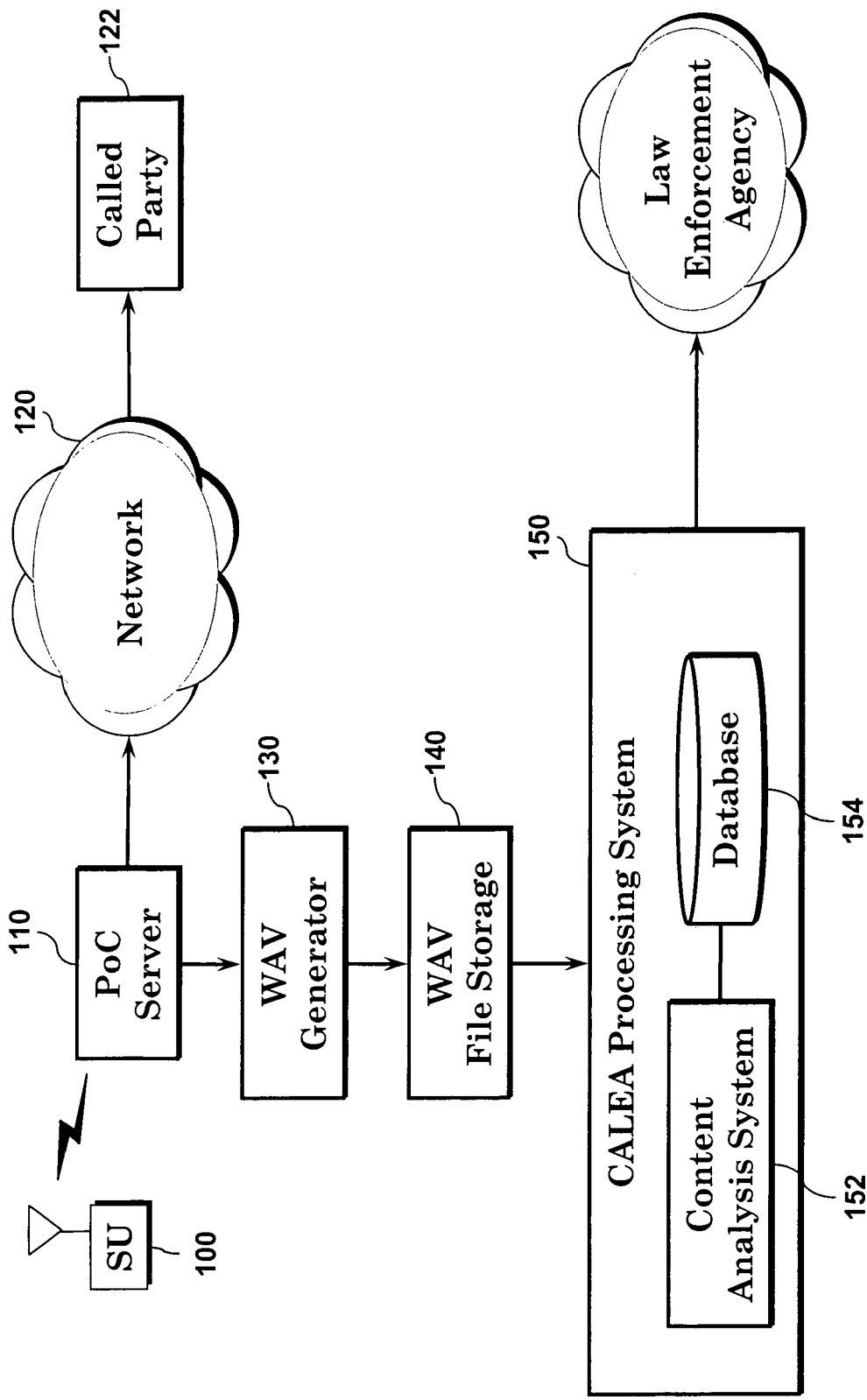
FIG. 1 illustrates an embodiment of a system for analyzing communications between a calling party and a called party of the present invention.

FIG. 1 illustrates an embodiment of a system and method of the present invention. As can be seen, when a subscriber uses the dispatch feature of their subscriber unit, e.g., phone, 100 to start a dispatch session, a PoC server 110 performs normal dispatch processing of the call by forwarding the call via normal routing over the telecommunications provider's network 120 to a called party 122. As will be discussed later in this specification, the call may be a dispatch group call and, thus, there would be multiple called parties 122. The information contained in the dispatch call is generally the voice content, the calling party identity, the calling party location, and the number called.

At the same time as the normal call processing, the PoC server 110 duplicates the packets of the call and forwards the duplicated packets to WAV generator 130. The WAV generator 130 encodes the voice portion of the call in a file format, such as a WAV MIME file format. The file may be titled with an ID that correlates to a call identifying information record so that the received data and received voice, which may have been converted to a WAV file, can be matched. In certain cases, the WAV file can simply be titled with identifying information so that the relationship is evident. The single file with associated information or the single file and associated call identifying information are forwarded to WAV file storage 140. Thus, the present invention provides for recording dispatch calls in a file format and storing the dispatch call file in a file storage unit. The file format may be a WAV file.

If CALEA processing is implemented, the forwarded information is sent to the CALEA processing system 150 for further analysis. The CALEA system 150 may include a content analysis system 152, such as that available by Nexidia Inc., that analyzes the incoming voice data and a database 154. The analysis may include determining whether the calling or called party is under a CALEA watch. This is determined by a check of the database which contains court orders for this market to determine if the calling or called party is under surveillance.

If the identified person is not under a wiretap order, the file is either simply forwarded to WAV file storage 140 or discarded if the system is used solely for wiretap. As will be discussed later in this specification, the present invention can be utilized in many other applications where it is desirable to record a dispatch call and analyze the content of the recorded dispatch call. For these other applications, the WAV file is stored in file storage 140 for further analysis even if the identified person is not under a wiretap order. If a party to the communication is under surveillance, the content analysis system 152 performs a check of the file looking for individual words and/or discussion phrases, both of which are hereinafter singularly referred to generally as a keyword, that are indicative of subject matter covered by the wiretap order and which are contained in the database 154. If the system matches any of the keywords in the database to words in the file, a copy of the file and associated calling data is forwarded to the law enforcement agency. If no matches are made, the file may be stored and call-identifying information only is sent to the law enforcement agency. Whereas FIG. 1 only illustrates a singular law enforcement agency, as will also be discussed later in this specification, if the subject is under multiple wiretap orders from multiple law enforcement agencies, the CALEA processing system will contain information related to these multiple orders and agencies and will appropriately forward the communication(s) to the appropriate agency(s).

The present invention is not limited to recording the dispatch session in any particular format nor to analyzing the content of the recorded session in any particular format. For example, the dispatch session may be recorded and stored in one format and converted to another format for content analysis. This may be desirable depending upon the particular file recording and storage system used and the particular content analysis system used. All that is required is that, in an embodiment, the dispatch session be recorded and analyzed for its content.

Therefore, in an embodiment of the present invention, by recording each dispatch transaction upon activating a dispatch call, a file is generated which provides a record of the start and end times, location (via Global Positioning System (GPS) information obtained from the phones or network-based location determination methods), content, and calling and called party(s) of each dispatch transaction. Additional data available or required by the court order may also be included, e.g., the subsystem that was used in the communications, the data rate, QoS, etc. All of this additional data is known by the service provider and can be added to the record, if desired/required. Moreover, session WAV recordings may be automatically delivered and stored in standard MMS servers, private company servers, or delivered to law enforcement agencies. The dispatch WAV recordings can be sent to the processor for analysis of the content of the dispatch call and then forwarded to the law enforcement agency(s) if the content meets certain criteria.

Accordingly, the present invention provides a system and method that may be utilized across a broad range of telecommunication services, including PoC, Voice Over Internet Protocol (VoIP), circuit-switched, immediate messaging and a variety of other systems.

As discussed above, any particular subject may be subject to multiple wiretap orders from multiple law enforcement agencies. In accordance with the principles of the present invention, the CALEA processing system 150 is able to serve as a centralized system that can analyze communications in which the subject is a participant with respect to all of the wiretap orders issued on that subject. Accordingly, the CALEA processing system is able to analyze the communications for a keyword, e.g., counterfeit, from one wiretap order and forward the communications to the associated law enforcement agency, e.g., the FBI, that contain that keyword and also analyze the communications for a second keyword, e.g., child support, from a second wiretap order and forward the communications to a second associated law enforcement agency, e.g., a city police department, that contain that keyword.

Additionally, the CALEA processing system may perform the functionality of a relational database that stores information related to wiretap orders and relates particular pieces of information from any one or multiple wiretap orders to other pieces of information from that one or the other wiretap orders. For example, in any one wiretap surveillance, the subject may be talking about the same keyword with several different parties in different communications. In this circumstance, the relational database would associate the keyword with the different parties and provide the associated information to the relevant law enforcement agency. In another example, the subject could be under wiretap surveillance by the FBI for terrorism related crimes and also be under wiretap surveillance by the CIA for terrorism. In this circumstance, each separate wiretap order may result in information that may only be authorized for release to the agency that is designated in the respective wiretap order. However, the relational database could associate the individual pieces of information from both wiretap orders and provide the associated information to both law enforcement agencies. In this manner, law enforcement agencies could benefit from receiving associated information that may help "connect the dots" in an investigation that may involve multiple parties, crimes, and law enforcement agencies, particularly in the circumstance where forwarding of the communications themselves to the different law enforcement agencies may not be authorized under the wiretap orders. The relational database analyzes individual pieces of information from various sources and associates the information for possible forwarding to a law enforcement agency(s). The relational database functionality can be included in, for example, database 154 or content analysis system 152, or be included in a separate component not illustrated in system 150.

The present invention is not limited to any particular methodology for associating the information by the relational database. Any of a variety of uses of keywords, names of parties, times of communications, locations of communications, etc., can be contemplated by those skilled in the art for the relational database of the present invention.

Further, the CALEA processing system is able to notify a centralized authority, e.g., the Department of Homeland Security, that multiple agencies have multiple court orders on the same subject to facilitate interagency communications in a legal manner. The centralized authority generally has cognizance over the multiple agencies.

A further description of an embodiment of a system and method of the present invention is provided below for use in CALEA monitoring. After further describing this embodiment, later in this specification it will be discussed how the present invention could be utilized to redefine the requirements of law enforcement agencies for monitoring the communications of a surveillance target while still protecting the target's privacy and assuring that law enforcement agencies receive only authorized data.

Figure 2:
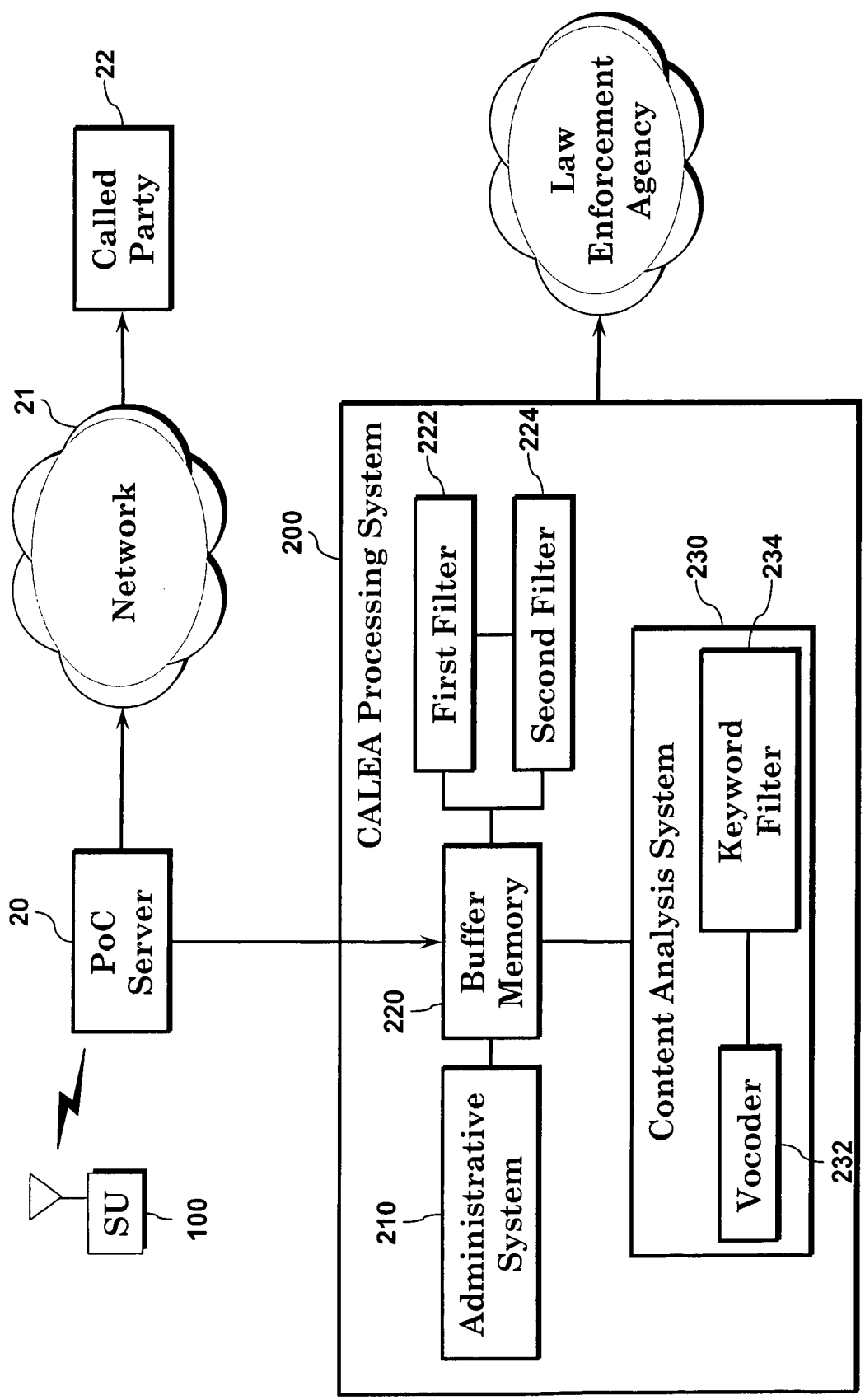
FIG. 2 illustrates a second embodiment of a system of the present invention.

A second embodiment of a CALEA monitoring system 200 is illustrated in FIG. 2. In executing the wiretap, the law enforcement agency presents a valid court order to the telecommunications provider. The telecommunications provider enters the pertinent information regarding this order into administrative system 210. The administrative system is a secure facility that enables the quick and private provisioning of a wiretap order by a carrier. The provisioning of this service will not affect the user's experience or delay calls in any manner. The attachment of the service will be transparent to the user. In the administrative system 210, the wiretap order information is set up. The start and end times for the order are entered into administrative system 210 as well as are all the keywords for the order as provided by the law enforcement agency. As discussed previously, the keywords are individual words or conversation phrases that would, in a manual wiretap, authorize the law enforcement agency to continue monitoring the call. For example, in a wiretap related to the theft of art, keywords may include: Picasso, fence it fast, pay me to steal, canvas, hot, museum, and pay and deliver.

As the user begins his communications, the packets generated are sent to a buffer memory 220 for both storage and analysis. In the case of a subscriber setting up and making a PoC call to another party, the packets of the call are duplicated by a PoC server 20 and sent to both the called party(s) 22 through network 21 and to the buffer memory 220 of the CALEA processing system 200 wherefrom, as will be further described, they may be sent from the system to a law enforcement agency(s).

In buffer memory 220 the header from the packet is removed and analyzed. The header defines the calling and called parties of the communication and the calling group if the communication is a group call. A first filter 222 determines if the subject is part of this call. This filter performs this function because only calls with the subject as a party are authorized for surveillance. If this call is a dispatch call between the subject and another party, the header is passed from the first filter 222 to a second filter 224, as will be explained. Further with respect to the analysis performed by first filter 222, if the call is a group call, filter 222 determines if the group has the ID of the group(s) that is authorized for surveillance by the wiretap order. A subject may be a member of a large number of PoC groups. He may have separate "groups" defined for his family, business associates, golf buddies, and his co-conspirators in the crime that is the subject of the wiretap order. Each group has a unique group ID and a set of subscribers who have selected to be part of the group. The wiretap order may specify that only a particular group(s) is subject to wiretap. In this example, it is assumed that the call is a group call with the "golf buddies" group and that this group has been authorized for wiretap. Therefore, these packets are also sent to second filter 224 for further analysis. However, if the group that is generating the conversation is not a group authorized by the wiretap order, the wiretap must stop immediately and first filter 222 sends a "stop and purge" message to buffer 220. Upon receiving this message, the buffer 220 discards all of the packets stored regarding this conversation and the surveillance ends.

As discussed above, if the first filter 222 determines that the conversation is a dispatch call involving the subject and one other party or is a group call that is authorized for surveillance, first filter 222 sends the packets to second filter 224. Second filter 224 then determines if the subject of the wiretap was present in the conversation. If not, the wiretap is not authorized. Of course, if the conversation is a dispatch call between the subject and one other party then it is determined by second filter 224 that the subject is present in the call and, as will be further described below, the packets will be sent to a content analysis system 230. In the case of a group call, it is possible that the communications are between other members of the group and the subject is not present in the call, e.g., he has his phone turned off. By analyzing the registration records and the header, the filter software can determine whether the packets for this conversation were either sent by or received by the subject. If the subject was present in the group call, the packets are passed to system 230. If the subject was not registered in the system and therefore was not receiving the packets, a "stop and purge" message is sent to buffer 220, as described above. As is known, a subject is "present" in a group call even if the subject is only listening to the conversation and, thus, not speaking.

In content analysis system 230, an analysis of the content of the call is performed to determine if the subject matter of the call warrants monitoring by the law enforcement agency under the wiretap order. Any delays in providing the communication to the law enforcement agency, if it is ultimately provided to the authorized agency, due to the analysis of the packets by system 200 are on the order of milliseconds and do not impact the telecommunications provider's ability to meet CALEA requirements. During the analysis process, new packets continue to be received in the buffer memory 220 as the real-time conversation continues.

As discussed above, data buffered in the buffer 220, if it passes the filtering processes of filters 222 and 224, begins to be exported to the system 230 in the order in which it was received. A vocoder 232 may be included in content analysis system 230 to translate the voice portion of the packets from one format, e.g., a compressed format as compressed by VSELP (Vector Sum Excited Linear Predictive speech compression) and as delivered by the PoC server 20, to a format compatible with the content analysis system 230. This step may or may not be required and the present invention is not limited to any particular format(s) for the packets as received from the PoC server and as analyzed by the content analysis system. Nor is the present invention limited to any particular content analysis system. One such format and content processor that may be used in the present invention is a format known as .PAT (phonetic audio track) which is used by a voice processor from Nexidia, Inc.

As the data is converted, for example, to the .PAT format it is then forwarded through the content analysis system's keyword search filter 234. In filter 234, a minimization timer is started based on a minimization time set by the court. The filter 234 looks for words matching a keyword list defined by the law enforcement agency and approved by the court for this wiretap surveillance. The keyword search continues until the minimization timer expires. This marks the end of the minimization period. The keyword list may be maintained in either the administrative system 210 or in the keyword search filter 234, or in any other part of system 200. All that is required for this embodiment is that a keyword search be capable of being performed on the content of the communication.

In an embodiment, the keyword list may be accessed and updated by the law enforcement agency, as may be permitted by the court order, during the duration of the surveillance period. Thus, the law enforcement agency can view the list of keywords and modify the list in conformance with the wiretap order. The keyword list may be accessed either directly by the law enforcement agency, with appropriate safeguards by the service provider for privacy in relation to other information in the system, or indirectly, e.g., providing an "off-line" list to law enforcement for review and update with changes implemented by the service provider. The law enforcement agency could either directly or indirectly access the list through any communications medium, e.g., a TCP/IP connection to the appropriate mechanism.

If a keyword is heard within the minimization period, the conversation, which has already met the first two filter criteria and which has now met the content criteria within the allotted period, is provided to the law enforcement agency by CALEA processing system 200. The entire conversation is exported at the original rate it was received, however, it will be time-shifted by the processing time of system 200. Even though the conversation is time-shifted, an accurate record of the actual time of the conversation will be available because a time-stamp associated with the packets is provided by the PoC server at the time of the call.

The data of the conversation will continue to buffer as long as the session is active. When the session ends, the buffer will continue to empty until the entire stored conversation has been transmitted to the law enforcement agency. In an embodiment, the packets are delivered to the law enforcement agency from the buffer in their original format.

If the session drops and then restarts, the second session is considered a new session and the analysis process of CALEA processing system 200 will restart from the beginning for the second session. Most PoC systems will start a session upon the first user signaling for the floor. Since PoC and PTT systems are simplex systems, one person on the call can speak and the other person(s) can only listen. The term "floor" is used to indicate who is speaking (by mobile number). The first user to start the conversation causes the session to be set up and also takes the "floor" first. After he has finished speaking and "releases the floor", another speaker may "take the floor" by pressing their push-to-talk button. In many systems, if no one requests and accepts the floor for a set period of time, e.g., 15 seconds, the session is considered finished and the session will end. To restart the session someone will have to reinitiate the call.

With the present invention, if a keyword is not heard within the minimization period, the present invention provides options for law enforcement agencies and the courts for possible preservation of the conversation for evidence purposes that improves over the current minimization "all or nothing" approach. Each of these options will be explained below.

Through use of the present invention, a wiretap order may be able to authorize a new surveillance process that would permit further analysis of the content of the conversation after the minimization time expires. At least two options may be associated with this process. The first option is to continue analysis beyond the minimization time and if a keyword is present in the conversation, then the process of forwarding the packets to the law enforcement agency will begin immediately. This option may be generally referred to as "minimization until keyword received." Of course, no forwarding of packets to the law enforcement agency is permitted if no keywords are detected and the conversation can then optionally be purged from the system after the conversation ends.

In a second option under this new process, where the court has authorized continued monitoring of the conversation beyond the permitted minimization time, as accomplished by use of the system and method of the present invention, if keywords are heard, the system can immediately notify the law enforcement agency that the call contains keywords that were detected after the minimization period expired. This data may then be stored and sealed by the system and not delivered to law enforcement. At any point after the notification, the law enforcement agency may notify the responsible judge that relevant content was detected post minimization and is stored and sealed with the telecommunications provider. The judge can then determine whether the content: 1) should be released to the law enforcement agency; 2) should not be released; 3) should remain sealed until notified by the court to either purge the conversation or deliver it to the law enforcement agency; or 4) should be released to the judge herself. The telecommunications provider can securely store the data awaiting an additional order from the law enforcement agency regarding disposition of the data based on the judge's determination. This option may be generally referred to as "minimization with store and seal order." Of course, again, under this option as with the option discussed above, no forwarding of packets to the law enforcement agency is permitted if no keywords are detected and the conversation may be purged from the system.

Also under this option, all communications of the subject may be recorded and stored. If the communications either contain a keyword prior to the minimization time or post minimization time, the communications will be handled as discussed above. However, even if the communications do not contain a stored keyword, the communications may still be stored and sealed by the system and not delivered to law enforcement. In this circumstance, it could be possible that the communications could be discovered to be relevant at a later point in time after reanalysis of the communications based on new information, e.g., new keywords for surveillance could be authorized under the wiretap order based on a continuing investigation. At this later point in time, the law enforcement agency may notify the responsible judge that newly discovered relevant content was detected in the stored and sealed communications and the judge can then determine, as discussed above, a proper disposition for the communications under the wiretap order. The telecommunications provider can securely store the data awaiting an additional order from the law enforcement agency regarding disposition of the data based on the judge's determination.

As discussed above, the present invention provides a system and method for wiretapping the conversations of a surveillance target that could change the way wiretaps are executed by law enforcement agencies. The present invention provides an analysis system and method that both protects the privacy of the individual being wiretapped and assures compliance by law enforcement to minimization requirements. With the present invention, conversations can be monitored for relevancy to the subject matter of a wiretap order up to the expiration of the minimization time. Because there is both a record of the conversation and the keywords detected before expiration of the minimization time, there is verification that the minimization requirements were met by law enforcement and that it was permitted to further monitor the conversation under the wiretap order. Additionally with the present invention, the conversations can also be monitored beyond the expiration of the minimization time by the present invention without violating the privacy rights of the surveillance subject. Because the monitoring is done by the present invention and not the law enforcement agency, the only time the law enforcement agency receives the conversation after the minimization time expires is if its receipt is authorized under the wiretap order. The present invention provides a system and method that can protect the privacy of the surveillance subject, verify compliance with minimization requirements, preserve potential evidence for a law enforcement agency, and meet the requirements of CALEA. Thus, the present invention provides an improved system and method and meets all of the legal requirements of CALEA for intercepting communications, namely: 1) unobtrusive monitoring; 2) preservation of the privacy rights of all parties; 3) delivery of the intercepted communications outside of the telecommunications service provider network; and 4) real time or timely delivery of the intercepted communications to the law enforcement agency.

Therefore, with the present invention, in addition to the known trap-and-trace and Title III content wiretap orders, additional wiretap orders may be authorized as further discussed below.

Trap and Seal—This would permit law enforcement to receive call identifying information and also have the present invention record and store the conversations. The conversations are thus preserved but not released to law enforcement until the judge issues an order for release. The judge has the options of ordering that the data be deleted, be sent to law enforcement, or be sent to the judge for review so she can make a determination regarding the relevance of the conversation. This option could provide law enforcement with the content of the conversation if the initial trap-and-trace wiretap justifies this additional intrusion.

Title III with Automated Release prior to Minimization Time-Out—This process automates the minimization decision. The present invention analyzes the conversation to determine if a keyword is detected prior to minimization time-out. If a keyword is detected, the call is released to law enforcement for further monitoring. If a keyword is not detected before time-out, the conversation is not automatically released to law enforcement.

Title III with Post Minimization Release—This process essentially eliminates the minimization requirement. At any point during the call, if a keyword is detected, the entire conversation is automatically delivered to law enforcement, albeit delayed by the processing time.

Title III with Post Minimization Store and Seal—This process stores the conversation if a keyword is detected after the minimization period. The post minimization keyword causes data to be stored and sealed until a further order is received by the telecommunications provider. A message may be sent to the judge, the court, and/or the law enforcement agency to notify them that relevant call content was detected after minimization and that it has been stored.

After the stored conversation is sealed, it is the obligation of the telecommunications provider to prevent release of the conversation until a further order is received. If a request for an order to release is denied by the court, the provider will be ordered to purge the data.

In an embodiment, the communications are stored in a digital format. Therefore, the communications may be preserved indefinitely by the service provider, the court, or by law enforcement until authorized for use or required again, e.g., in an appeal of a conviction. Because the communications are stored digitally as opposed to being stored on tape, the communications may be easily archived and archived without the risks attendant with tape, e.g., degradation.

As discussed previously, the present invention is not limited to PoC systems. The present invention can be utilized for law enforcement purposes in any of a variety of systems including, but not limited to, circuit-switched systems, Voice over IP (VoIP) systems, and any other voice related systems. Additionally, the present invention is not limited to requiring a live conversation to be recorded in order to use the voice analysis principles of the present invention. The voice content portion of any recorded audio communication, e.g., movies, speeches on tape, MP3 formatted music, etc., can be analysed in the present invention In any of these systems or formats, whether live or recorded, the principles of the present invention for analyzing communications between parties can be utilized.

The present invention also provides the ability to correlate recorded voice information with call delivery information. In current systems for CALEA, special equipment is required to assure correlation between the voices recorded and the call delivery information. This is not necessary with the present invention because the saved files include both the voice information and the call delivery information, thus, the voice information is automatically related to the call delivery information.

Additionally, as was also discussed previously, the present invention is not limited to analysis of communications for law enforcement purposes. The present invention can be utilized in any application where it may be desirable to analyze communications between parties.

The present invention can provide for both validation of dispatch communications and data mining in the recorded conversations. By recording the PTT or PoC sessions as files in a storage medium, for example as WAV files, a record is maintained for the sessions that can validate the particulars of the sessions, e.g., called party, calling party, location of handsets (via GPS in the handset or network-based location determination methods), start and end times of the sessions, and content of the sessions. Additionally, the stored files can be searched for keywords by the analysis system to mine for particular data in the sessions.

Whereas the illustrated embodiments identify particular functional components for the system and method of the present invention, the present invention is not limited to any particular architecture for these functional components nor are any particular functions limited to a particular embodiment. Multiple functions can be combined in any one component and various components and functions can be included in different systems, sub-systems, and embodiments. For example, the relational database discussed above in connection with the embodiment of FIG. 1 can also be included in the CALEA processing system 200 of FIG. 2, such as in, for example, administrative system 210.

The disclosed embodiments are illustrative of the various ways in which the present invention may be practiced. Other embodiments can be implemented by those skilled in the art without departing from the spirit and scope of the present invention.

What is claimed is:

1. A method of delivering a communication to a law enforcement agency under the Communications Assistance for Law Enforcement Act (CALEA), comprising the acts of:
   receiving a communication at a service provider network;
   recording the communication;
   storing the recorded communication;
   forwarding the stored recorded communication to a CALEA processing system;
   analyzing a voice content portion of the recorded communication by the CALEA processing system to determine if the voice content portion contains a keyword stored in a database; and
   forwarding the recorded communication to a law enforcement agency if the keyword is detected in the voice content portion.

2. The method of claim 1 wherein the communication is a circuit-switched telephone call.

3. The method of claim 1 wherein the communication is a dispatch call.

4. The method of claim 1 wherein the recorded communication is forwarded to the law enforcement agency only if the keyword is detected before a minimization time expires.

5. The method of claim 1 further comprising the act of analyzing the recorded communication to determine if the communication is a dispatch call involving a surveillance target of the law enforcement agency and one other party.

6. The method of claim 1 further comprising the act of analyzing the recorded communication to determine if the communication is a dispatch group call that is authorized for surveillance.

7. The method of claim 6 further comprising the act of analyzing the dispatch group call to determine if a surveillance target of the law enforcement agency is present in the dispatch group call.

8. A method of delivering a communication to a law enforcement agency under the Communications Assistance for Law Enforcement Act (CALEA), comprising the acts of:
receiving a communication at a service provider network;
recording the communication;
analyzing a voice content portion of the recorded communication to determine if the voice content portion contains a keyword stored in a database;
forwarding the recorded communication to a law enforcement agency if the keyword is detected in the voice content portion;
wherein the recorded communication is forwarded to the law enforcement agency only if the keyword is detected before a minimization time expires and wherein if the keyword is not detected before the minimization time expires the recorded communication is stored in a storage medium under seal;
adding a new keyword to the database after the recorded communication is stored and sealed;
analyzing the stored and sealed communication to determine if the voice content portion contains the new keyword; and
forwarding the stored and sealed communication to the law enforcement agency after a court order authorizing delivery of the communication is received by the service provider.

9. A method of delivering a communication to a law enforcement agency under the Communications Assistance for Law Enforcement Act (CALEA), comprising the acts of:
receiving a communication at a service provider network;
recording the communication;
analyzing a voice content portion of the recorded communication to determine if the voice content portion contains a keyword stored in a database;
forwarding the recorded communication to a law enforcement agency if the keyword is detected in the voice content portion;
receiving a second communication at the service provider network;
recording the second communication;
analyzing a voice content portion of the second recorded communication to determine if the voice content portion contains a second keyword stored in the database; and
forwarding the second recorded communication to the law enforcement agency if the second keyword is detected in the voice content portion;
wherein the first communication involves a person that is subject to a first wiretap order from a first law enforcement agency and the second communication involves the person and is relevant to a second wiretap order from a second law enforcement agency.

10. The method of claim 9 further comprising the act of notifying a centralized authority that the person is subject to the first wiretap order from the first law enforcement agency and that the person is subject to the second wiretap order from the second law enforcement agency.

11. The method of claim 9 further comprising the acts of:
associating information related to the first communication to information related to the second communication by a relational database; and
providing the associated information to at least one of the first law enforcement agency, the second law enforcement agency, or a centralized authority.

12. A system for delivering a communication to a law enforcement agency under the Communications Assistance for Law Enforcement Act (CALEA), comprising:
a buffer memory for receiving a recorded communication from a service provider network; and
a content analysis system coupled to the buffer memory wherein the content analysis system analyzes a voice content portion of the recorded communication to determine if the voice content portion contains a keyword stored in a database;
wherein the recorded communication is forwarded to a law enforcement agency if the keyword is detected in the voice content portion before a minimization time expires and wherein if the keyword is not detected before the minimization time expires the recorded communication is stored in the buffer memory under seal, and further wherein the stored and sealed communication is forwarded to the law enforcement agency after a court order authorizing delivery of the communication is received by the service provider.

13. The system of claim 12 wherein the communication is a circuit-switched telephone call.

14. The system of claim 12 wherein the communication is a dispatch call.

15. The system of claim 12 further comprising a first filter coupled to the buffer memory wherein the first filter analyzes the recorded communication to determine if the communication is a dispatch call involving a surveillance target of the law enforcement agency and one other party.

16. The system of claim 12 further comprising a first filter coupled to the buffer memory wherein the first filter analyzes the recorded communication to determine if the communication is a dispatch group call that is authorized for surveillance.

17. The system of claim 16 further comprising a second filter coupled to the buffer and the first filter and wherein the second filter analyzes the dispatch group call to determine if a surveillance target of the law enforcement agency is present in the dispatch group call.

18. The system of claim 12 wherein the content analysis system includes a vocoder wherein the vocoder translates the voice content portion from a first format to a second format.

19. The system of claim 12 wherein the content analysis system includes a keyword filter and wherein the keyword filter includes a minimization timer.

20. The system of claim 19 wherein the keyword filter performs a keyword search to detect a word in the recorded communication that matches a keyword defined by the law enforcement agency.

21. The system of claim 20 wherein the keyword search is conducted until an expiration of a time set in the minimization timer.

22. A method of recording dispatch calls, comprising the acts of:
receiving, by a dispatch server, a dispatch call;
recording a voice content portion of the dispatch call;
storing the recorded voice content portion of the dispatch call in a file format in a file storage unit;

forwarding the stored recorded voice content portion of the dispatch call to a CALEA processing system;

analyzing the recorded voice content portion of the dispatch call by the CALEA processing system to determine if the voice content portion contains a keyword stored in a database; and forwarding the dispatch call to a law enforcement agency if the keyword is detected in the voice content portion.

23. The method of claim 22 wherein the file format is a WAV file.

24. A dispatch call recording system, comprising:

a dispatch server;

a file generator coupled to the dispatch server, wherein the file generator receives a dispatch call from the dispatch server and creates a record file of the dispatch call;

a file storage unit coupled to the file generator wherein the file storage unit stores the record file of the dispatch call; and a CALEA processing system coupled to the file storage unit wherein the CALEA processing system analyzes a voice content portion of the record file of the dispatch call to determine if the voice content portion contains a keyword stored in a database and wherein the CALEA processing system forwards the dispatch call to a law enforcement agency if the keyword is detected in the voice content portion.

25. The system of claim 24 wherein the dispatch call is forwarded to the law enforcement agency in a format as received by the dispatch server.

* * * * *